United States Patent
Pachidis et al.

(10) Patent No.: US 11,952,942 B2
(45) Date of Patent: Apr. 9, 2024

(54) GAS TURBINE ENGINE WITH DIVERTER FENCES

(71) Applicant: ROLLS-ROYCE plc, London (GB)

(72) Inventors: Vasileios Pachidis, Milton Keynes (GB); David J Rajendran, Bedford (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/199,260

(22) Filed: May 18, 2023

(65) Prior Publication Data
US 2023/0374939 A1   Nov. 23, 2023

(30) Foreign Application Priority Data
May 20, 2022   (GR) ............... 20220100424

(51) Int. Cl.
*F02C 7/042* (2006.01)
*F02K 3/06* (2006.01)

(52) U.S. Cl.
CPC ............. *F02C 7/042* (2013.01); *F02K 3/06* (2013.01); *F05D 2240/12* (2013.01); *F05D 2240/14* (2013.01); *F05D 2260/606* (2013.01)

(58) Field of Classification Search
CPC ........ F02C 7/042; F02K 3/06; F05D 2240/12; F05D 2240/14; F05D 2260/606
See application file for complete search history.

(56) References Cited

U.S. PATENT DOCUMENTS

| | | | |
|---|---|---|---|
| 3,476,486 A | 11/1969 | Chilman et al. | |
| 3,747,341 A | 7/1973 | Davis | |
| 3,964,257 A * | 6/1976 | Lardellier | F04D 27/023 60/39.23 |
| 4,030,290 A | 6/1977 | Stachowiak | |
| 5,076,052 A | 12/1991 | Wildner | |

(Continued)

FOREIGN PATENT DOCUMENTS

| | | |
|---|---|---|
| EP | 3 845 754 A1 | 7/2021 |
| GB | 2 070 691 A | 9/1981 |

(Continued)

OTHER PUBLICATIONS

Oct. 19, 2023 Extended European Search Report Issued in European Patent Application No. 23169565.1.

(Continued)

*Primary Examiner* — Steven M Sutherland
(74) *Attorney, Agent, or Firm* — Oliff PLC

(57) ABSTRACT

A gas turbine engine includes a core engine casing and a bypass duct defined between a nacelle and the core engine casing. The gas turbine engine further includes a plurality of diverter fences pivotally coupled to the core engine casing. Each diverter fence is pivotable relative to the core engine casing about a pivot axis, which is circumferentially and obliquely inclined with respect to a principal rotational axis. Each diverter fence is configured to move between a first position in which an outboard edge is disposed adjacent to a casing outer surface, and a second position in which the outboard edge is radially spaced apart from the casing outer surface, such that each diverter fence radially extends outwards from the casing outer surface into the bypass duct.

20 Claims, 7 Drawing Sheets

(56) References Cited

U.S. PATENT DOCUMENTS

| | | | |
|---|---|---|---|
| 5,315,821 | A | 5/1994 | Dunbar et al. |
| 10,753,278 | B2 | 8/2020 | Nestico et al. |
| 11,255,295 | B2 | 2/2022 | Pouyau et al. |
| 2013/0025260 | A1 | 1/2013 | Pitiot et al. |
| 2013/0067885 | A1 | 3/2013 | Suciu et al. |
| 2017/0226960 | A1 | 8/2017 | Nakano et al. |
| 2017/0284297 | A1 | 10/2017 | Nestico et al. |
| 2018/0135557 | A1 | 5/2018 | Pouyau et al. |
| 2018/0355739 | A1* | 12/2018 | Zysman ................ F01D 25/12 |

FOREIGN PATENT DOCUMENTS

| | | | |
|---|---|---|---|
| WO | 2021/038169 | A1 | 3/2021 |
| WO | 2022/263203 | A1 | 12/2022 |

OTHER PUBLICATIONS

Oct. 17, 2023 Notice of Allowance issued in U.S. Appl. No. 18/199,245.
Sep. 26, 2023 Extended European Search Report issued in European Patent Application No. 23169566.9.
Jan. 9, 2023 Search Report issued in British Patent Application No. 2210040.8.
Jan. 3, 2023 Combined Search and Examination Report issued in British Patent Application No. 2210039.0.
U.S. Appl. No. 18/199,245, filed May 18, 2023 in the name of Pachidis et al.

\* cited by examiner

GAS TURBINE ENGINE WITH DIVERTER FENCES

CROSS-REFERENCE TO RELATED APPLICATIONS

This specification is based upon and claims the benefit of priority from Greek patent application number GR 20220100424 filed on May 20, 2022, the entire contents of which is incorporated herein by reference.

The present application is co-filed with a United States patent application that is based upon and claims the benefit of priority from Greek patent application GR 20220100425 filed on May 20, 2022.

BACKGROUND

Field of the Disclosure

The present disclosure generally relates to a gas turbine engine.

Description of the Related Art

Many known gas turbine engines (e.g., aircraft engines) have a ducted fan and a core engine arranged in flow communication with one another. The fan provides air to the core engine (a "core flow") and to a bypass duct surrounding the core engine (a "bypass flow"). The gas turbine engine may include an annular splitter at which the flow is divided between the core flow and the bypass flow.

Fans generally include a fan disk mounted to the core engine and multiple fan blades mounted to the fan disk for rotation with the fan disk. Some known fans have blades for which a pitch may be varied to optimize a performance of the fan. Such fans may be configured such that the blades, at one pitch angle, generate an aftward directed flow resulting in a forward thrust, and, at another pitch angle, generate a forward directed flow resulting in a reverse thrust. The reverse thrust may be useful in certain situations, e.g., during landing of an aircraft.

During the revere thrust, air is forced around the engine (through the bypass duct) before it is drawn into the core engine. A portion of the forward directed flow may follow a sharp turn at the annular splitter to enter an entry duct of the core engine. Upon entering the entry duct of the core engine, air flows in a relatively normal direction, i.e., from forward to aftward. Although air is provided into the core engine during the reverse thrust, the reverse flow within the gas turbine engine causes the core engine to operate in distorted flow conditions.

Firstly, since the annular splitter is typically designed with a sharp edge, the flow entering the core engine may need to negotiate a tight, low radius of curvature U-turn. This may result in formation of a large flow separation region that occupies outer annular regions of the entry duct. This condition may be referred to as "duct separation". Duct separation may result in steep gradation of total pressure distribution at the entry duct of the core engine that includes depressed portions at the outer annular regions and relatively higher pressure portions at inner annular regions. The extent of this radial total pressure distortion may be above acceptable limits for stable operation of the core engine.

Secondly, in gas turbine engines with outlet guide vanes (OGVs) in the bypass duct, the forward directed flow is deflected by the OGVs at an OGV inlet angle as the flow exits the OGVs. This flow (moving towards the OGV inlet angle) may then be incident on an engine section stator (ESS) blade row provided at the entry duct of the core engine after turning sharply at the annular splitter. The difference between a nominal inlet angle of the ESS blades and the OGV inlet angle may result in a large adverse negative incidence on the ESS blades causing substantial flow separation at an aerofoil pressure side of the ESS blades effectively blocking the complete aerofoil passage. This flow separation may be referred to as "aerofoil separation". Aerofoil separation may increase a total pressure loss at the entry duct of the core engine and may adversely affect the operation of the core engine.

Conventional approaches to address "duct separation" include mechanical design elements and associated actuation systems to introduce an auxiliary opening in the annular splitter or to increase the radius of curvature of the forward directed flow at a splitter edge of the annular splitter. Such solutions are complex and need to be packaged in or near the splitter edge, which is intended by design to be narrow and has a thickness that is as small as possible. Further, in typical gas turbine engine architectures, the Engine Section Stator (ESS) blades are located immediately aft of the splitter edge in the entry duct of the core engine. Thus, such conventional approaches may face an additional constraint due to the location of the ESS blades.

Implementation of such design alleviations may result in an engine design that is significantly altered and compromised to address these aforementioned problems that are experienced only for a fraction of the engine operation (e.g., during landing). Consequently, the effect of these design changes may inordinately affect a performance of the aircraft during normal operation.

Additionally, no solutions are currently available that address the "aerofoil separation" problem. Conventional generic aerofoil designs that are developed to make the aerofoils tolerant to large incidence angle variations are not effective in handling the extent of incidence angle variation as observed between the forward directed flow and the reverse directed flow. Moreover, these generic aerofoil designs may result in deterioration of nominal cruise performance of the gas turbine engine.

SUMMARY OF THE DISCLOSURE

According to a first aspect, there is provided a gas turbine engine having a principal rotational axis. The gas turbine engine further includes a fan coaxial with the principal rotational axis and a nacelle circumferentially surrounding the fan. The gas turbine engine further includes a core engine disposed downstream of the fan and extending along the principal rotational axis. The gas turbine engine further includes a core engine casing circumferentially surrounding the core engine around the principal rotational axis. The core engine casing extends along the principal rotational axis from a first casing end to a second casing end downstream of the first casing end. The first casing end is proximal to the fan. The core engine casing includes a casing outer surface. The gas turbine engine further includes a bypass duct defined between the nacelle and the core engine casing. The gas turbine engine further includes a plurality of diverter fences pivotally coupled to the core engine casing proximal to the first casing end, such that each diverter fence from the plurality of diverter fences is pivotable relative to the core engine casing about a pivot axis. The plurality of diverter fences are arranged circumferentially around the principal rotational axis. The pivot axis is circumferentially and obliquely inclined with respect to the principal rotational axis by a pivot inclination angle. Each diverter fence includes a leading edge facing the first casing end and axially spaced apart from the first casing end along the principal rotational axis. Each diverter fence further includes a trailing edge opposite to the leading edge. Each diverter fence further includes an inboard edge extending between the leading edge and the trailing edge along the casing outer surface. The inboard edge at least partially engages the casing outer surface. Each diverter fence further includes an outboard edge opposite to the inboard edge and extending between the leading edge and the trailing edge. The gas turbine engine further includes an actuation mechanism operatively coupled to each diverter fence. Each diverter fence is configured to move between a first position in which the outboard edge is disposed adjacent to the casing outer surface and a second position in which the outboard edge is radially spaced apart from the casing outer surface. In the second position, each diverter fence radially extends outwards from the casing outer surface into the bypass duct. The actuation mechanism is configured to selectively move each diverter fence between the first position and the second position.

Each diverter fence from the plurality of diverter fences may move between the first position (operational during aftward directed flow resulting in forward thrust) and the second position (operational during forward directed flow resulting in reverse thrust). Thus, during the reverse thrust, the forward directed flow of air may be intercepted by the plurality of diverter fences that may provide both radial and circumferential guidance to the flow before turning into the core engine at the first casing end (or a splitter edge) of the core engine casing.

During the reverse thrust, the circumferential guidance may be provided to the forward directed flow since each diverter fence is pivotable relative to the core engine casing about the pivot axis that is circumferentially and obliquely inclined with respect to the principal rotational axis. Thus, the forward directed flow may be directed based on the pivot inclination angle of each diverter fence such that the flow is substantially directed to mitigate distorted flow conditions inside the core engine (i.e., "aerofoil separation" at stator blades or ESS blades).

Additionally, in the second position, each diverter fence may further direct the forward directed flow of air radially outwards with respect to the principal rotational axis to increase a radius of curvature of the forward directed flow as the airflow negotiates a sharp turn at the first casing end of the core engine casing. This may mitigate formation of pressure separation portions at radially outer annular extents of the core engine casing (or "duct separation"), thereby mitigating steep gradation of total pressure distribution at an entry to the core engine.

The plurality of diverter fences may remain in the first position during nominal operation of the gas turbine engine (i.e., during aftward directed flow resulting in forward thrust). Thus, the plurality of diverter fences of the present disclosure has minimal impact on the overall design of the gas turbine engine with simple implementation to address operability distress of the core engine arising during forward directed flow (i.e., reverse thrust) conditions. Thus, the conventional design approaches that are complex and potentially detrimental to nominal operation of the gas turbine engine may be avoided. Further, implementation of the plurality of diverter fences of the present disclosure may not compromise with the nominal performance of the gas turbine engine.

Moreover, since the plurality of diverter fences may only need to be thick enough to ensure structural integrity, a power required for the actuation mechanism is lower as compared to the conventional design approaches that involve auxiliary passages through the splitter edge.

In some embodiments, the gas turbine engine further includes a plurality of outlet guide vanes (OGVs) arranged around the principal rotational axis. Each OGV from the plurality of OGVs is disposed between the nacelle and the core engine casing. The plurality of diverter fences are axially disposed between the first casing end and the plurality of OGVs with respect to the principal rotational axis. Thus, during the reverse thrust, the forward directed flow of air exiting the plurality of OGVs at an OGV inlet angle may be circumferentially guided by the plurality of diverter fences (in the second position) disposed between the first casing end and the plurality of OGVs to at least partially align the flow to mitigate the "aerofoil separation" at the ESS blades arising due to difference between a nominal inlet angle of the ESS blades and the OGV inlet angle.

In some embodiments, the gas turbine engine further includes a plurality of stator vanes coupled to the core engine casing proximal to the first casing end. The core engine casing further includes a casing inner surface, such that the plurality of stator vanes radially extend inwards from the casing inner surface towards the principal rotational axis. At least a portion of each of the plurality of diverter fences is axially disposed between the first casing end and the plurality of stator vanes with respect to the principal rotational axis. In some embodiments, the plurality of stator vanes may be ESS blades. Thus, during the reverse thrust, each diverter fence may mitigate the "aerofoil separation" at the ESS blades due to the circumferential guidance of the forward directed flow provided by the plurality of diverter fences in the second position. The circumferential guidance may align the forward directed flow towards the nominal inlet angle of the plurality of stator vanes.

In some embodiments, the fan is configured to selectively operate in a normal mode and a reverse mode. In the normal mode, the fan is configured to generate an airflow in a first direction from the first casing end to the second casing end. In the reverse mode, the fan is configured to generate an airflow in a second direction opposite to the first direction. In the reverse mode, the airflow in the second direction inside the gas turbine engine may cause an aircraft (to which the gas turbine engine may be mounted) to decelerate, thereby enabling the aircraft to stop over shorter landing distances and reduce wear on brakes of the aircraft.

In some embodiments, in the normal mode, the plurality of diverter fences are in the first position. In the reverse mode, each diverter fence is in the second position, such that each diverter fence is configured to direct an airflow in the bypass duct radially outwards and circumferentially with respect to the principal rotational axis. Thus, the plurality of diverter fences may only be operational during the reverse mode while minimising an impact of design modifications due to the implementation of the plurality of diverter fences on the gas turbine engine in the normal mode of the fan.

Each diverter fence may direct the airflow in the bypass duct (i.e., the forward directed flow) radially outwards to increase the radius of curvature of the airflow at the first casing end of the core engine casing as the airflow negotiates a sharp turn at the first casing end during the reverse mode, thereby mitigating the "duct separation" at an entry to the core engine casing.

Additionally, in the reverse mode, each diverter fence may direct the airflow in the bypass duct (i.e., the forward directed flow) circumferentially to at least partially align the airflow towards the nominal inlet angle of the stator vanes, thereby mitigating the "aerofoil separation" at the stator vanes.

In some embodiments, each diverter fence further includes a first major surface defined between the leading edge, the trailing edge, the inboard edge, and the outboard edge. In the first position, the first major surface contacts the casing outer surface. Each diverter fence further includes a second major surface opposite to the first major surface. In the second position, the second major surface faces the second casing end. Thus, in the first position, the first major surface of each diverter fence may contact the casing outer surface and prevent any disproportionate impact on the overall gas turbine engine design and performance in the normal mode. Further, in the second position, the second major surface may face the second casing end, thereby at least partially intercepting the airflow in the bypass duct (i.e., the forward directed flow) to direct the airflow radially outwards and circumferentially with respect to the principal rotational axis.

In some embodiments, the second major surface follows a shape of the casing outer surface, such that, in the first position, the second major surface is flush with the casing outer surface. Since the second major surface of each diverter fence is flush with the casing outer surface in the first position, the plurality of diverter fences have minimal impact on a performance of the gas turbine engine in the normal mode.

In some embodiments, each diverter fence has a constant thickness between the first major surface and the second major surface. Thus, the first major surface and the second major surface may have a substantially similar shape (e.g., arcuate shape).

In some embodiments, each of the first major surface and the second major surface is curved. This may allow the plurality of diverter fences to form an annular arrangement around the principal rotational axis in the respective first positions while conforming to a shape of the casing outer surface of the core engine casing.

In some embodiments, the outboard edge follows a shape of the casing outer surface, such that, in the first position, the outboard edge is flush with the casing outer surface. This may allow minimal impact on the design and performance of the gas turbine engine in the normal mode due to the implementation of the plurality of diverter fences since the outboard edge may eliminate any discontinuity in the casing outer surface.

In some embodiments, each diverter fence has a constant radial distance between the inboard edge and the outboard edge.

In some embodiments, each of the inboard edge and the outboard edge is curved. Thus, each of the inboard edge and the outboard edge may conform to the shape of the casing outer surface (which may be curved as well).

In some embodiments, each of the leading edge and the trailing edge is linear.

In some embodiments, each diverter fence has a constant axial distance between the leading edge and the trailing edge.

In some embodiments, the pivot inclination angle is from about 20 degrees to about 70 degrees. The value of pivot inclination angle may impact the circumferential guidance of the forward directed flow in the reverse mode.

In some embodiments, the leading edge extends radially from a leading inboard point intersecting with the inboard edge to a leading outboard point intersecting with the outboard edge. In the second position, an axis joining the leading inboard point to the leading outboard point is inclined obliquely to a tangent to the casing outer surface at the leading inboard point by a fence inclination angle.

In some embodiments, the fence inclination angle is from about 5 degrees to about 90 degrees. The value of fence inclination angle may impact the radial and circumferential guidance of the forward directed flow in the reverse mode.

In some embodiments, the plurality of diverter fences include at least three diverter fences.

In some embodiments, the plurality of diverter fences are disposed equiangularly around the principal rotational axis.

In some embodiments, at least a portion of the core engine casing axially disposed between the first casing end and the trailing edge of each diverter fence along the principal rotational axis is continuous and devoid of any passage that fluidly communicates the bypass duct with the core engine. Thus, in the reverse mode, the airflow in the bypass duct may enter the core engine only after negotiating the sharp turn at the first casing end of the core engine casing. Further, the plurality of diverter fences disposed proximal to the first casing end may intercept the airflow and provide radial as well as circumferential guidance to the airflow before the airflow turns towards the core engine at the first casing end.

In some embodiments, the plurality of diverter fences are disposed adjacent to each other, such that in the first position, the outboard edge of each diverter fence is disposed proximal to or in engagement with the inboard edge of an adjacent diverter fence from the plurality of diverter fences. In the respective first positions, the plurality of diverter fences form an annular arrangement around the principal rotational axis. Thus, the plurality of diverter fences may have minimal impact on the performance of the gas turbine engine in the normal mode by eliminating any hinderance or obstruction.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
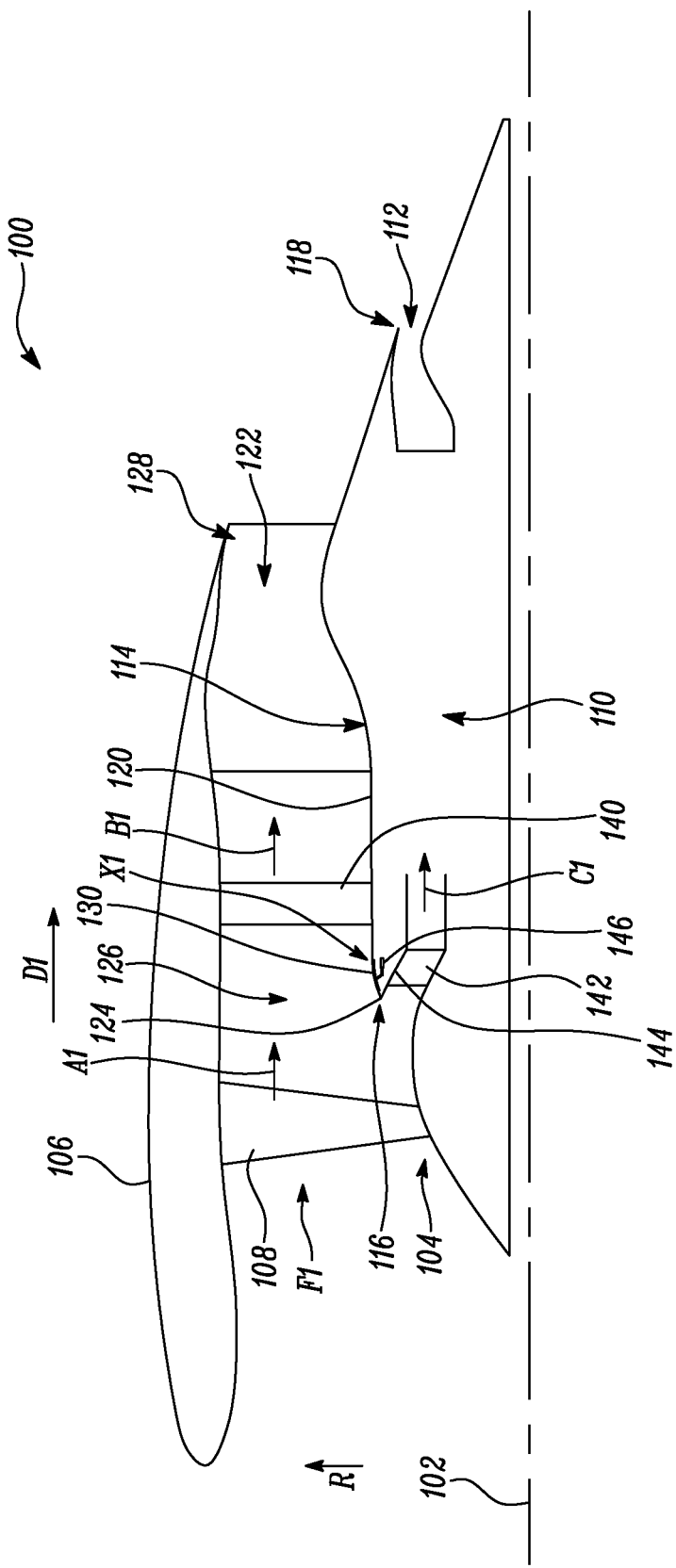
FIG. 1 is a schematic sectional side view of a gas turbine engine in a normal mode of a fan, according to an embodiment of the present disclosure.
Figure 2:
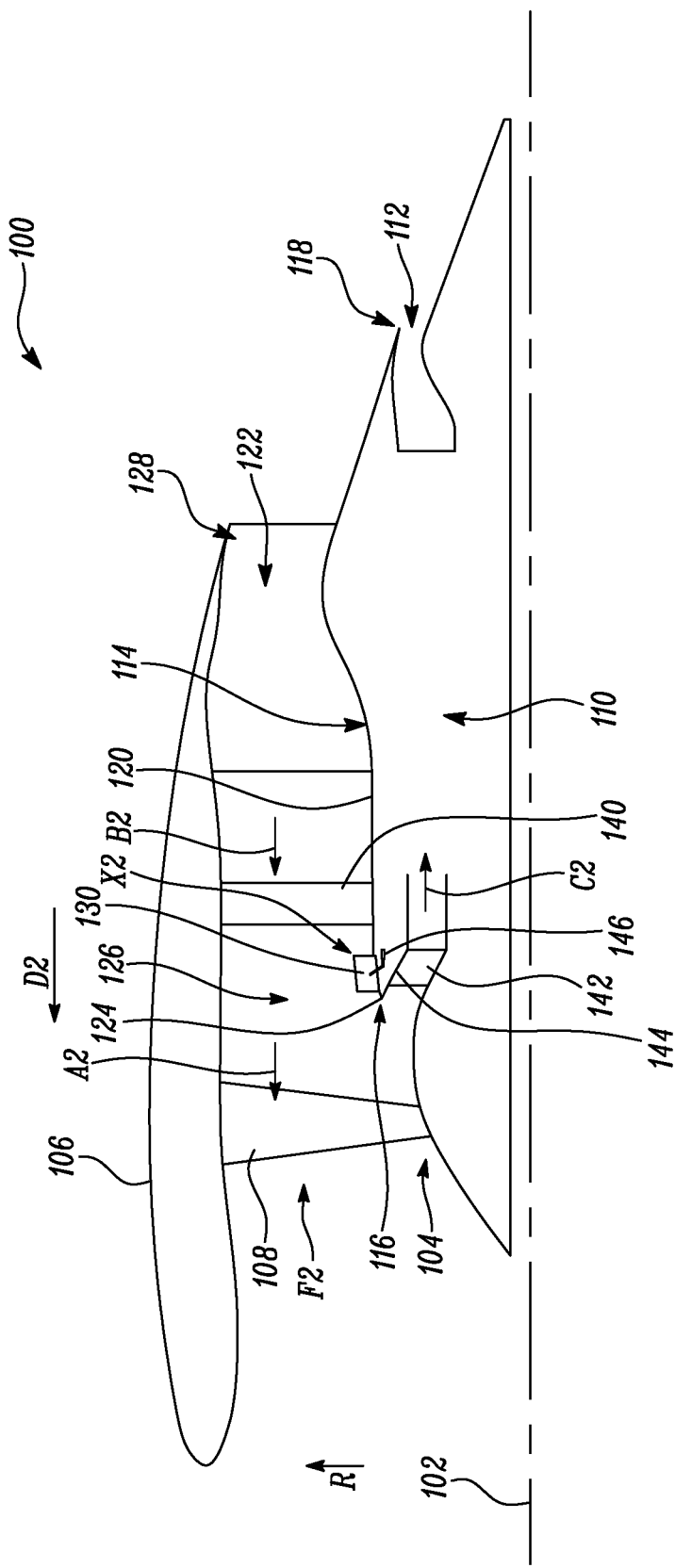
FIG. 2 is a schematic sectional side view of the gas turbine engine in a reverse mode of the fan, according to an embodiment of the present disclosure.

FIGS. 1 and 2 illustrate schematic sectional side views of a gas turbine engine 100. In some embodiments, the gas turbine engine 100 may be used to drive and/or provide power to an aircraft (not shown).

As used herein, the term "aircraft" includes, but is not limited to, helicopters, airplanes, fixed wing vehicles, variable wing vehicles, rotary wing vehicles, unmanned combat aerial vehicles, tailless aircraft, hover crafts, and other airborne vehicles. Further, the present invention may also be contemplated for utilization in other applications that may not be coupled with an aircraft, such as, for example, industrial applications, power generation, pumping sets, naval propulsion, weapon systems, security systems, perimeter defence/security systems, and the like known to one of ordinary skilled in the art.

The gas turbine engine 100 includes a principal rotational axis 102. A radial direction R is defined with respect to the principal rotational axis 102 of the gas turbine engine 100. As used herein, terms that refer to a radial direction, such as "radially outer", "radially inner", "radially extends", "radially inwards", "radially outwards", and "radially proximal", are with respect to the radial direction R. A circumferential direction C (shown in FIG. 3A) is defined with respect to the principal rotational axis 102. As used herein, terms that refer to a circumferential direction, such as "circumferentially extends", "circumferentially extending", "circumferentially surrounding", "circumferentially inclined", "circumferentially with respect to", "circumferential guidance", and "circumferentially disposed between", are with respect to the circumferential direction C.

The gas turbine engine 100 further includes a fan 104 coaxial with the principal rotational axis 102. A nacelle 106 circumferentially surrounds the fan 104. The gas turbine engine 100 further includes a core engine 110 disposed downstream of the fan 104 and extending along the principal rotational axis 102. In some embodiments, the core engine 110 includes, in axial flow series, a compressor (not shown), a combustion equipment (not shown), a turbine (not shown), and a core exhaust nozzle 112.

The fan 104 includes multiple blades 108 that may generate an airflow. The fan 104 provides the airflow to the core engine 110 which, in turn, generates a combustion gas (or a mixture of gases) that powers the turbine. The turbine may then drive the fan 104 to produce thrust for the gas turbine engine 100. The fan 104 may be coupled to the turbine via a shaft (not shown).

The gas turbine engine 100 further includes a core engine casing 114 circumferentially surrounding the core engine 110 around the principal rotational axis 102. The core engine casing 114 extends along the principal rotational axis 102 from a first casing end 116 to a second casing end 118 downstream of the first casing end 116. The first casing end 116 is proximal to the fan 104. The gas turbine engine 100 further includes a splitter 124 at the first casing end 116. The core engine casing 114 includes a casing outer surface 120.

The gas turbine engine 100 further includes a bypass duct 122 defined between the nacelle 106 and the core engine casing 114. The bypass duct 122 is delimited radially between the nacelle 106 and the casing outer surface 120 of the core engine casing 114.

The fan 104 is a variable-pitch fan (i.e., having variable-pitch blades). A pitch of the blade 108 is measured via an angle of pitch which corresponds to an angle defined between a cord line of the blade 108 and a reference plane extending generally through a pitch axis of the blade 108 and extending along an axial direction of the gas turbine engine 100 parallel to the principal rotational axis 102. Thus, the fan 104 may allow the pitch of the blades 108 to be varied by rotating the blades 108 about respective pitch axes to increase a performance of the gas turbine engine 100.

In some embodiments, the fan 104 is configured to selectively operate in a normal mode F1 (shown in FIG. 1) and a reverse mode F2 (shown in FIG. 2). In the normal mode F1, the fan 104 is configured to generate an airflow A1 in a first direction D1 from the first casing end 116 to the second casing end 118. In some embodiments, the splitter 124 divides the airflow A1 into a bypass airflow B1 which passes through the bypass duct 122 and a core airflow C1 which passes through the core engine 110.

In some embodiments, in the normal mode F1, the angle of pitch of the blades 108 of the fan 104 may be positive, thereby generating the airflow A1 from upstream to downstream of the gas turbine engine 100. As used herein in the application, the terms "upstream" and "downstream" are with respect to the airflow A1 along the first direction D1, i.e., the normal mode F1 of the fan 104. The bypass airflow B1 enters the bypass duct 122 through a forward inlet 126 of the bypass duct 122 and exits the bypass duct 122 through an aft outlet 128 of the bypass duct 122. The airflow A1 may generate a forward thrust propelling the aircraft forward. This mode of operation is used, for example, when the aircraft is in a take-off and/or a cruise phase.

In the reverse mode F2 (shown in FIG. 2), the fan 104 is configured to generate an airflow A2 in a second direction D2 opposite to the first direction D1. In some embodiments, in the reverse mode F2, the angle of pitch of the blades 108 of the fan 104 may be negative, thereby generating the airflow A2 from downstream to upstream of the gas turbine engine 100. In the reverse mode F2 (shown in FIG. 2), a bypass airflow B2 enters the bypass duct 122 through the aft outlet 128 and move towards the forward inlet 126. The airflow A2 may generate a reverse thrust (or counter-thrust), which may help the aircraft to slow down, for example, to reduce a braking distance of the aircraft during landing.

A portion of the bypass airflow B2 is used to feed the core engine 110 as a core airflow C2. Particularly, the portion of the bypass airflow B2 negotiates a sharp turn at the splitter 124 to enter the core engine 110 as the core airflow C2. Thus, the core airflows C1, C2 always circulate in the core engine 110 from upstream to downstream of the gas turbine engine 100.

Figure 3B:
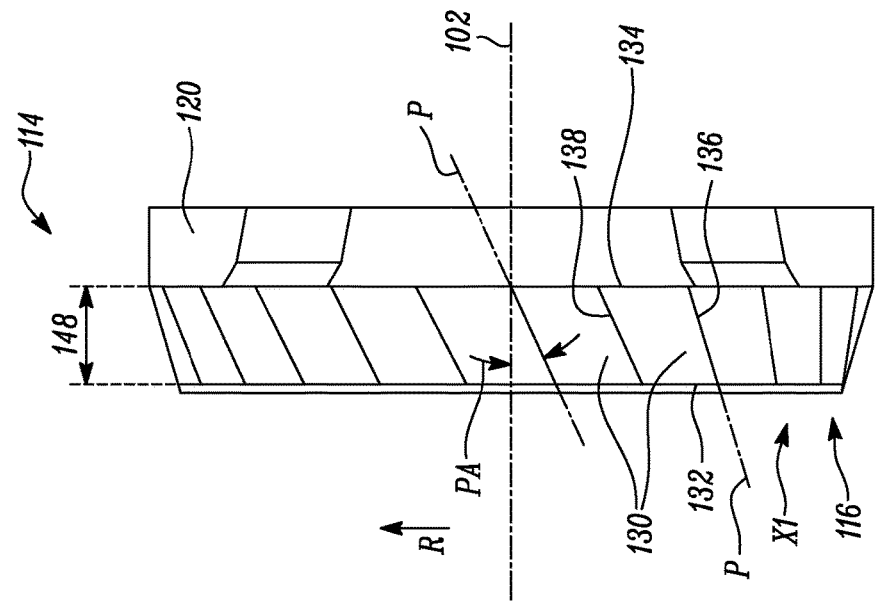
FIG. 3B is a schematic side view of a first casing end of a core engine casing of the gas turbine engine in the first position of the diverter fences, according to an embodiment of the present disclosure.
Figure 3A:
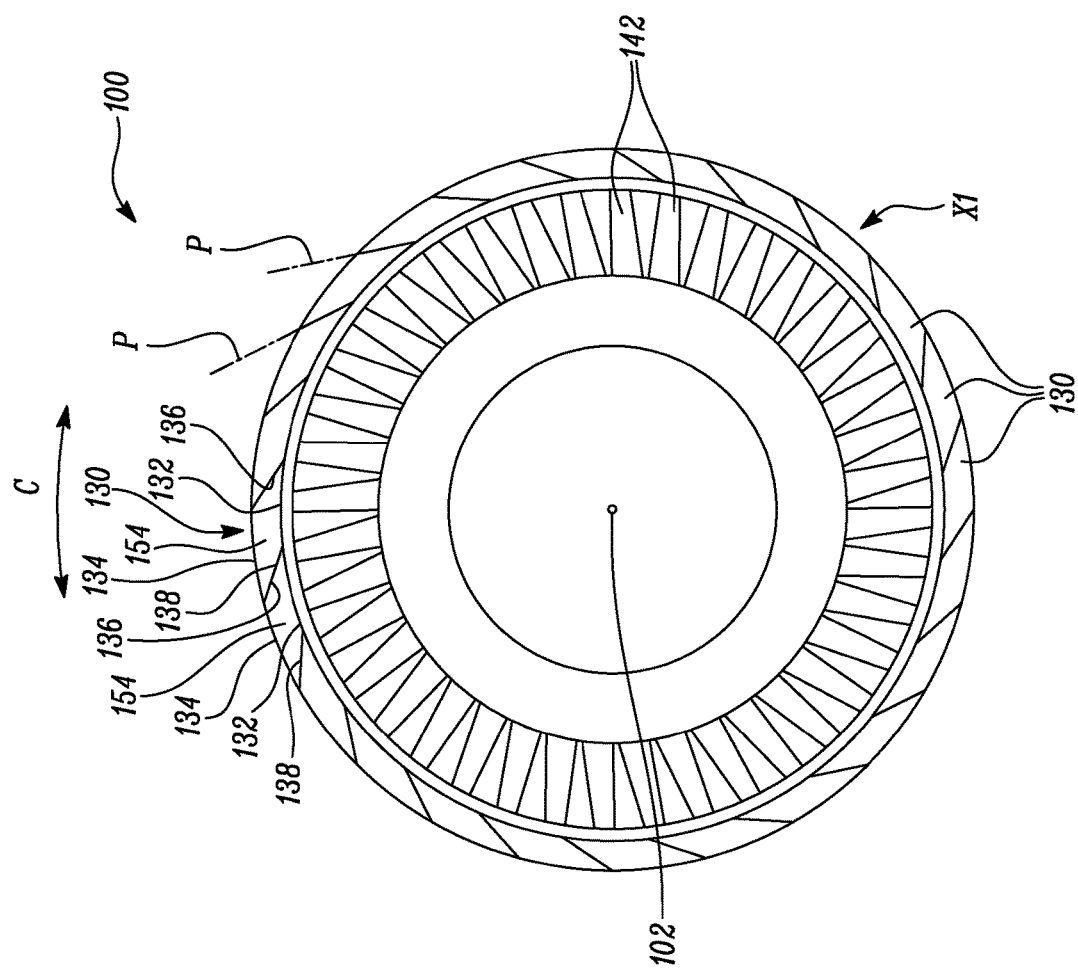
FIG. 3A is a schematic front view of the gas turbine engine in a first position of diverter fences, according to an embodiment of the present disclosure.

The gas turbine engine 100 further includes a plurality of diverter fences 130 pivotally coupled to the core engine casing 114 proximal to the first casing end 116, such that each diverter fence 130 from the plurality of diverter fences 130 is pivotable relative to the core engine casing 114 about a pivot axis P (shown in FIGS. 3A and 3B). The plurality of diverter fences 130 are arranged circumferentially around the principal rotational axis 102.

In some embodiments, in the normal mode F1 (shown in FIG. 1), the plurality of diverter fences 130 are in a first position X1, and in the reverse mode F2 (shown in FIG. 2), each diverter fence 130 is in a second position X2. As shown in FIG. 2, in the second position X2, each diverter fence 130 radially extends outwards from the casing outer surface 120 into the bypass duct 122. Thus, each diverter fence 130 may intercept the bypass airflow B2 in the second position X2 and may provide radial and circumferential guidance to the bypass airflow B2 with respect to the principal rotational axis 102. This is described in greater detail later in the application. Further, each diverter fence 130 is in the second position X2 only during the reverse mode F2 of the fan 104.

In some embodiments, the gas turbine engine 100 further includes an actuation mechanism 146 (also shown in FIGS. 4 and 6) operatively coupled to each diverter fence 130. The actuation mechanism 146 is configured to selectively move each diverter fence 130 between the first position X1 (shown in FIG. 1) and the second position X2 (shown in FIG. 2). It should be understood that any suitable type of actuation mechanism 146 may be utilized (e.g., a pneumatic or hydraulic push-lever-arm, electric motor powered, or other actuation mechanism) for selectively moving each diverter fence 130 between the first position X1 (shown in FIG. 1) and the second position X2 (shown in FIG. 2).

In some embodiments, each diverter fence 130 may be a thin plate that may remain in the first position X1 in the normal mode F1 of the fan 104. A thickness of each diverter fence 130 may need only be sufficient to ensure a structural integrity of the diverter fence 130 to minimize a weight and a power requirement of the actuation mechanism 146. In some embodiments, the plurality of diverter fences 130 may be made of any suitable material, e.g., a metal, a polymer, a composite, a ceramic, or a combination thereof. Further, the plurality of diverter fences 130 may be produced using any suitable manufacturing method known to one skilled in the art.

In some embodiments, the gas turbine engine 100 further includes a plurality of outlet guide vanes (OGVs) 140 arranged around the principal rotational axis 102. Each OGV 140 from the plurality of OGVs 140 is disposed between the nacelle 106 and the core engine casing 114. Further, each OGV 140 is positioned downstream of the fan 104 and extends outwardly from the core engine casing 114 along the radial direction R. The plurality of diverter fences 130 are axially disposed between the first casing end 116 and the plurality of OGVs 140 with respect to the principal rotational axis 102.

In some embodiments, the plurality of OGVs 140 may receive the bypass airflow B1 from the fan 104 in the normal mode F1 (shown in FIG. 1). The plurality of OGVs 140 may increase an efficiency of the fan 104 by redirecting the bypass airflow B1 as well as provide other benefits, such as, for example, decreasing an amount of noise generated by the gas turbine engine 100. In the normal mode F1 (shown in FIG. 1), the bypass airflow B1 may exit the OGVs 140 at an OGV exit angle. Alternatively, in the reverse mode F2 (shown in FIG. 2), the bypass airflow B2 may exit the plurality of OGVs 140 at an OGV inlet angle 141 (shown in FIG. 7A).

In some embodiments, the gas turbine engine 100 further includes a plurality of stator vanes 142 coupled to the core engine casing 114 proximal to the first casing end 116. The core engine casing 114 further includes a casing inner surface 144, such that the plurality of stator vanes 142 radially extend inwards from the casing inner surface 144 towards the principal rotational axis 102. In some embodiments, the plurality of stator vanes 142 may be referred to as "Engine Section Stator" (ESS) vanes or "core inlet stator" vanes. In other words, the plurality of stator vanes 142 are ESS vanes. In some embodiments, the plurality of stator vanes 142 may guide the core airflow C1 or the core airflow C2 entering the core engine 110.

At least a portion 143 (shown in FIG. 4) of each of the plurality of diverter fences 130 is axially disposed between the first casing end 116 and the plurality of stator vanes 142 with respect to the principal rotational axis 102. Specifically, the portion 143 (shown in FIG. 4) of each diverter fence 130 is disposed upstream of the plurality of stator vanes 142. Further, the plurality of stator vanes 142 may receive the core airflow C1 in the normal mode F1 (shown in FIG. 1) of the fan 104 and may receive the core airflow C2 in the reverse mode F2 (shown in FIG. 2) of the fan 104. The core airflow C2 forms a portion of the bypass airflow B2 exiting the plurality of OGVs 140 and turning towards the core engine 110 at the first casing end 116.

In some embodiments, an axial length (or an axial distance 148 shown in FIG. 3B) of each diverter fence 130 along the principal rotational axis 102 is from about 10% to about 100% of a chord length 176 (shown in FIG. 7B) of each stator vane 142. An increase in the axial length of each diverter fence 130 may increase the power required by the actuation mechanism 146 to move the diverter fence 130 between the first position X1 (shown in FIG. 1) and the second position X2 (shown in FIG. 2). Therefore, it may be preferred that the axial length may be kept as small as possible as is required for the radial and circumferential guidance of the bypass airflow B2 (shown in FIG. 2). It may be preferred that the plurality of diverter fences 130 may be located as close as possible to the first casing end 116 as may be accommodated by the axial length of each diverter fence 130.

FIG. 3A illustrates a schematic front view of the gas turbine engine 100 in the first position X1 of each diverter fence 130. FIG. 3B illustrates a schematic side view of the first casing end 116 of the core engine casing 114 in the first position X1 of each diverter fence 130. Some components (e.g., the fan 104) of the gas turbine engine 100 are not shown in FIGS. 3A and 3B for clarity.

Referring to FIGS. 3A and 3B, in some embodiments, the plurality of diverter fences 130 include at least three diverter fences 130. In the illustrated embodiment of FIG. 3A, the gas turbine engine 100 includes 24 diverter fences 130. However, it should be understood that the number of diverter fences 130 may vary based on application requirements. Further, the number of diverter fences 130 may depend on a design of the actuation mechanism 146 (shown in FIGS. 1 and 2) and an extent of the radial and circumferential guidance required by the bypass airflow B2 in the reverse mode F2 of the fan 104 (shown in FIG. 2).

In some embodiments, the plurality of diverter fences 130 may have a circumferential extent of about 360 degrees around the casing outer surface 120 of the core engine casing 114. In some embodiments, the plurality of diverter fences 130 are disposed equiangularly around the principal rotational axis 102. Thus, the plurality of diverter fences 130 may be spaced apart from each other at equal angles with respect to the principal rotational axis 102.

Each diverter fence 130 is pivotable relative to the core engine casing 114 about the pivot axis P. The pivot axis P is circumferentially and obliquely inclined with respect to the principal rotational axis 102 by a pivot inclination angle PA.

In some embodiments, the pivot inclination angle PA is from about 20 degrees to about 70 degrees. In some embodiments, the pivot inclination angle PA may be considered positive along an anti-clockwise direction with respect to the principal rotational axis 102 for clockwise rotation of the fan 104 (shown in FIGS. 1 and 2) when viewing from the front of the gas turbine engine 100. In some embodiments, the pivot inclination angle PA may be considered positive along a clockwise direction with respect to the principal rotational axis 102 for anti-clockwise rotation of the fan 104 (shown in FIGS. 1 and 2) when viewing from the front of the gas turbine engine 100.

Each diverter fence 130 includes a leading edge 132 facing the first casing end 116 and axially spaced apart from the first casing end 116 along the principal rotational axis 102. Each diverter fence 130 further includes a trailing edge 134 opposite to the leading edge 132. Each diverter fence 130 further includes an inboard edge 136 extending between the leading edge 132 and the trailing edge 134 along the casing outer surface 120. The inboard edge 136 at least partially engages the casing outer surface 120. Specifically, the inboard edge 136 is pivotally coupled to the casing outer surface 120 along the pivot axis P. Thus, the inboard edge 136 is also circumferentially and obliquely inclined with respect to the principal rotational axis 102 by the pivot inclination angle PA. Each diverter fence 130 further includes an outboard edge 138 opposite to the inboard edge 136 and extending between the leading edge 132 and the trailing edge 134.

In some embodiments, each of the inboard edge 136 and the outboard edge 138 is curved. However, the inboard edge 136 and the outboard edge 138 may assume any shape based on a shape of the casing outer surface 120 and application requirements. In some embodiments, each of the leading edge 132 and the trailing edge 134 is linear. However, the leading edge 132 and the trailing edge 134 may assume any shape based on a shape of the casing outer surface 120 and application requirements. In some embodiments, each diverter fence 130 has the constant axial distance 148 between the leading edge 132 and the trailing edge 134.

In the first position X1 of each diverter fence 130, the outboard edge 138 is disposed adjacent to the casing outer surface 120. In some embodiments, the plurality of diverter fences 130 are disposed adjacent to each other, such that in the first position X1, the outboard edge 138 of each diverter fence 130 is disposed proximal to or in engagement with the inboard edge 136 of an adjacent diverter fence 130 from the plurality of diverter fences 130, as shown in FIGS. 3A and 3B. In the respective first positions X1, the plurality of diverter fences 130 form an annular arrangement around the principal rotational axis 102.

In the first position X1, each diverter fence 130 is flush with the casing outer surface 120 of the core engine casing 114. In some embodiments, the outboard edge 138 follows a shape of the casing outer surface 120, such that, in the first position X1, the outboard edge 138 is flush with the casing outer surface 120. Thus, the plurality of diverter fences 130 may not obstruct the airflow A1 during normal mode F1 (shown in FIG. 1) of the fan 104, thereby, providing an aerodynamic continuity and avoiding disruption to the bypass airflow B1 (shown in FIG. 1).

Figure 4:
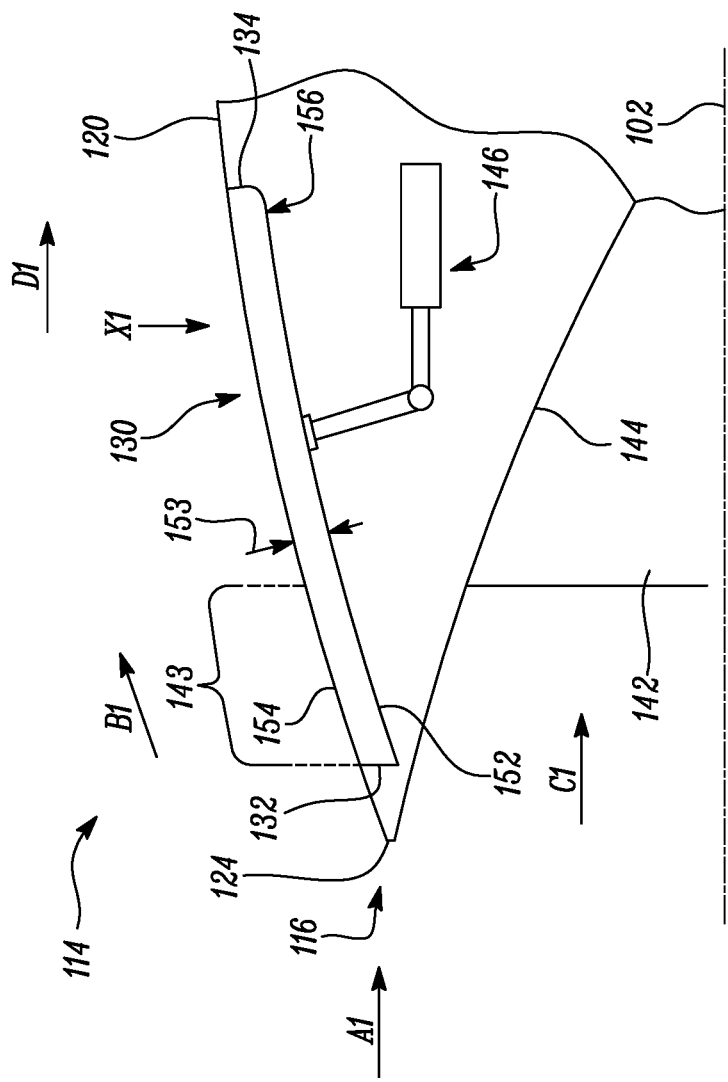
FIG. 4 is an enlarged schematic sectional side view of the first casing end in the first position of the diverter fences, according to an embodiment of the present disclosure.

FIG. 4 illustrates an enlarged schematic sectional side view of the first casing end 116 of the core engine casing 114. Specifically, FIG. 4 illustrates the plurality of diverter fence 130 in the first position X1. In the illustrated embodiment of FIG. 4, only one diverter fence 130 is shown from the plurality of diverter fences 130 for clarity. Further, in the illustrated embodiment of FIG. 4, only one stator vane 142 is shown from the plurality of stator vanes 142 for clarity.

In some embodiments, each diverter fence 130 further includes a first major surface 152 defined between the leading edge 132, the trailing edge 134, the inboard edge 136 (shown in FIGS. 3A and 3B), and the outboard edge 138 (shown in FIGS. 3A and 3B). In the first position X1, the first major surface 152 contacts the casing outer surface 120. Specifically, the core engine casing 114 includes a plurality of recesses 156 (also shown in FIG. 5A) corresponding to the plurality of diverter fences 130. Each recess 156 from the plurality of recesses 156 receives a corresponding diverter fence 130 in its first position X1, such that the first major surface 152 faces the recess 156.

In some embodiments, each diverter fence 130 further includes a second major surface 154 opposite to the first major surface 152. In some embodiments, the second major surface 154 follows a shape of the casing outer surface 120, such that, in the first position X1, the second major surface 154 is flush with the casing outer surface 120. Thus, the plurality of diverter fences 130 may maintain the aerodynamic continuity and avoid disruption to the bypass airflow B1 in the respective first positions X1.

In some embodiments, each diverter fence 130 has a constant thickness 153 between the first major surface 152 and the second major surface 154. In some embodiments, each of the first major surface 152 and the second major surface 154 is curved. In other words, the first major surface 152 and the second major surface 154 may follow the shape and contours of the casing outer surface 120 (which may also be curved).

Figures 5A, 5B:
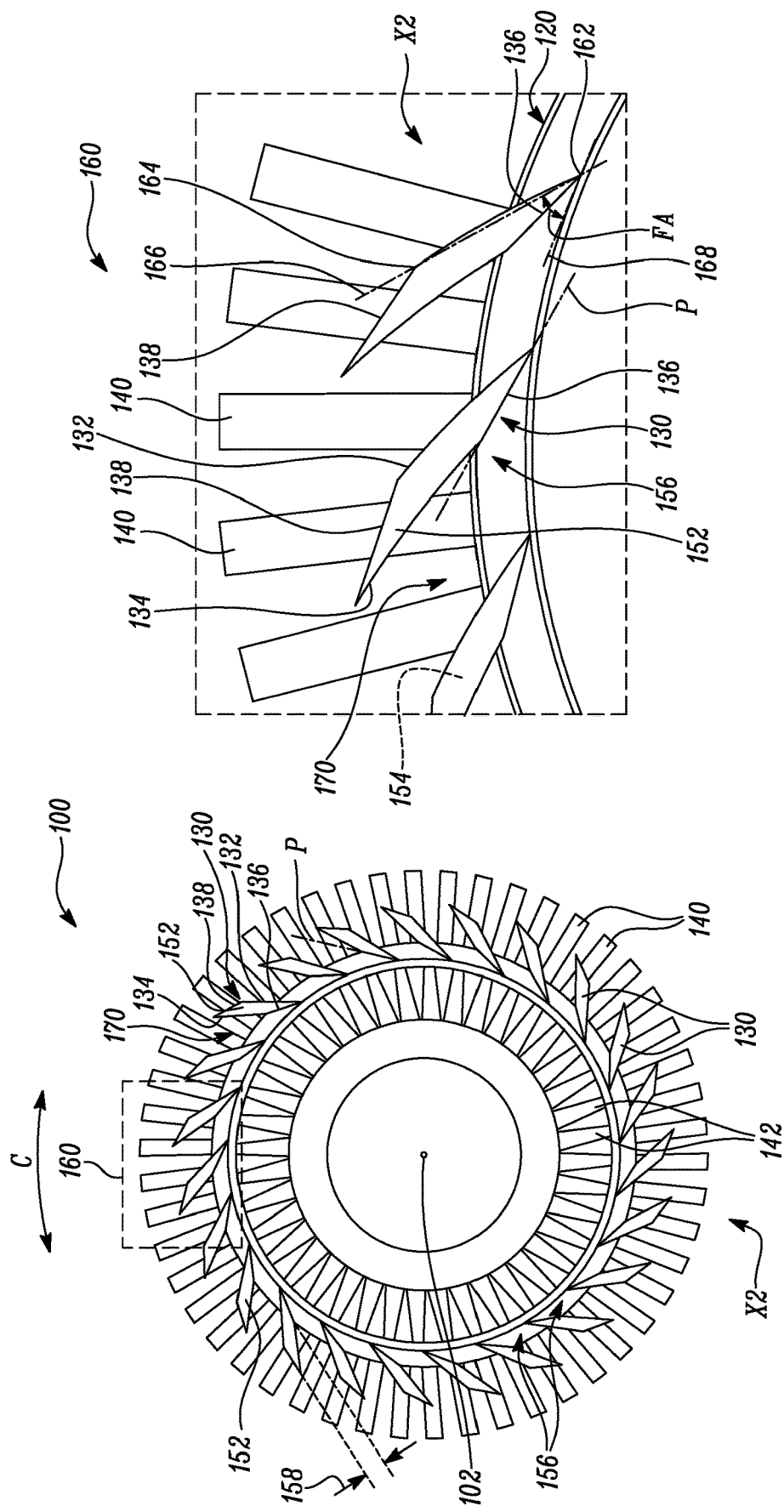
FIG. 5A is a schematic front view of the gas turbine engine in a second position of the diverter fences, according to an embodiment of the present disclosure.
FIG. 5B is an enlarged schematic perspective view of a section of the gas turbine engine as shown in FIG. 5A, according to an embodiment of the present disclosure.

FIG. 5A illustrates a schematic front view of the gas turbine engine 100 in the second position X2 of the plurality of diverter fences 130. Some components (e.g., the fan 104) of the gas turbine engine 100 are not shown in FIG. 5A for clarity.

In the second position X2, the outboard edge 138 of each diverter fence 130 is radially spaced apart from the casing outer surface 120. In the second position X2, the plurality of diverter fences 130 form flow channels 170 therebetween. In some embodiments, each diverter fence 130 has a constant radial distance 158 between the inboard edge 136 and the outboard edge 138. Thus, the plurality of diverter fences 130 may have a constant length along the circumferential direction C.

In the illustrated embodiment of FIG. 5A, the plurality of diverter fences 130 are rotated clockwise with respect to the circumferential direction C about the pivot axis P with the inboard edge 136 coupled to the casing outer surface 120 (shown in FIG. 5B) and the outboard edge 138 is radially spaced apart from the casing outer surface 120 (shown in FIG. 5B). However, the diverter fences 130 may also be configured to rotate anti-clockwise based on a design configuration of the gas turbine engine 100. In such cases, the outboard edge 138 may be coupled to the casing outer surface 120 while the inboard edge 136 may be radially spaced apart from the casing outer surface 120.

In some embodiments, the inboard edge 136 of each diverter fence 130 may be pivotably coupled to the casing outer surface 120 (shown in FIGS. 1 and 2) to allow each diverter fence 130 to rotate about the pivot axis P. Any suitable coupling mechanisms may be utilized for pivotably coupling each diverter fence 130 with the casing outer surface 120 (shown in FIGS. 1 and 2). For example, the inboard edge 136 of each diverter fence 130 may be hinged to the casing outer surface 120 (shown in FIGS. 1 and 2).

FIG. 5B illustrates an enlarged schematic perspective view of a section 160 (shown in FIG. 5A) of the gas turbine engine 100 in the second position X2 of each diverter fence 130.

In some embodiments, the flow channel 170 is formed between the second major surface 154 of one diverter fence 130 and the first major surface 152 of an adjacent diverter fence 130. The flow channels 170 may allow a portion of the bypass airflow B2 (shown in FIG. 2) to pass through the plurality of diverter fences 130.

In some embodiments, the leading edge 132 extends radially from a leading inboard point 162 intersecting with the inboard edge 136 to a leading outboard point 164 intersecting with the outboard edge 138. In some embodiments, in the second position X2, an axis 166 joining the leading inboard point 162 to the leading outboard point 164 is inclined obliquely to a tangent 168 to the casing outer surface 120 at the leading inboard point 162 by a fence inclination angle FA.

In some embodiments, the fence inclination angle FA may represent an angle of rotation of each diverter fence 130 about the pivot axis P from the first position X1. In some embodiments, the fence inclination angle FA is from about 5 degrees to about 90 degrees. In some embodiments, the fence inclination angle FA is about 45 degrees.

Figure 6:
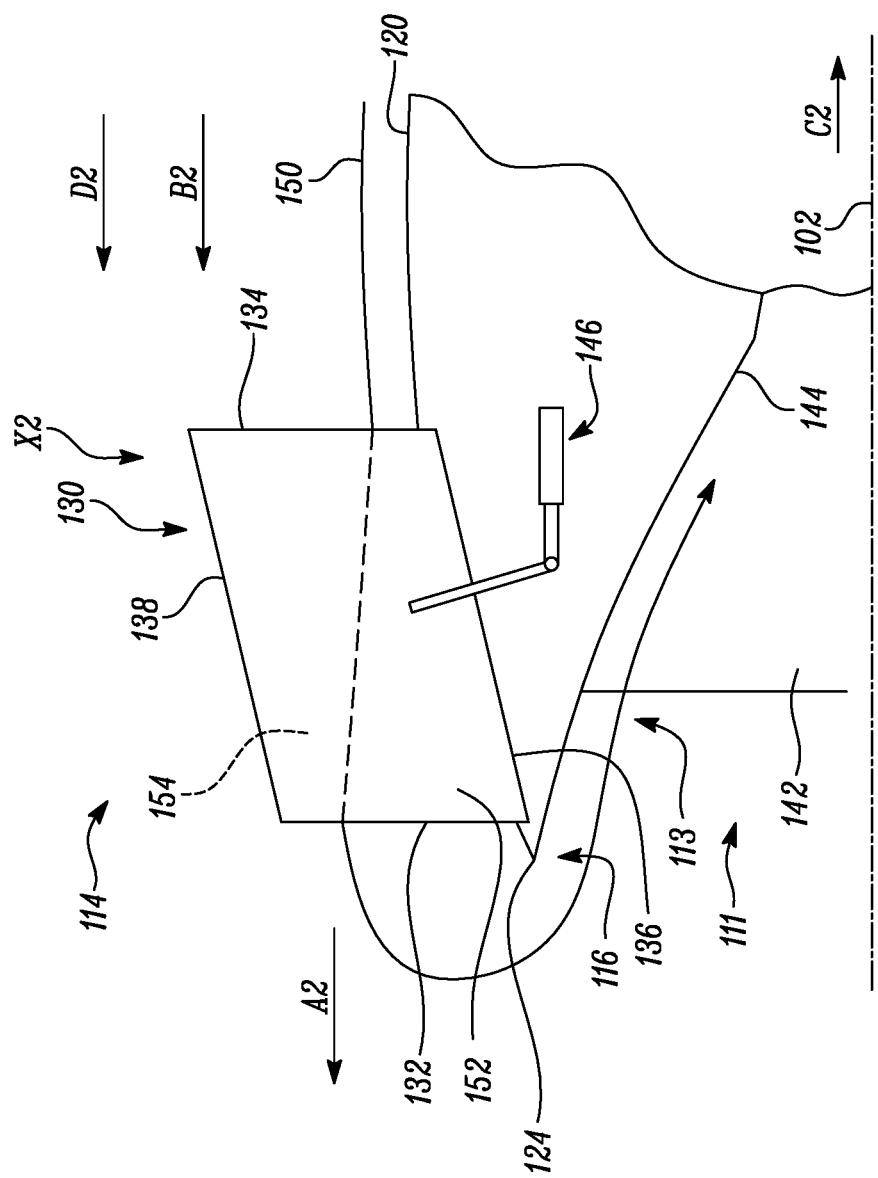
FIG. 6 is an enlarged schematic sectional side view of the first casing end in the second position of the diverter fences, according to an embodiment of the present disclosure.

FIG. 6 illustrates a schematic sectional side view of the first casing end 116 of the core engine casing 114. Specifically, FIG. 6 illustrates the plurality of diverter fences 130 in the second position X2. In the illustrated embodiment of FIG. 6, only one diverter fence 130 is shown from the plurality of diverter fences 130 for clarity. Further, in the illustrated embodiment of FIG. 6, only one stator vane 142 is shown from the plurality of stator vanes 142 for clarity. In the second position X2, the outboard edge 138 is radially spaced apart from the casing outer surface 120.

Each diverter fence 130 is in the second position X2 in the reverse mode F2 (shown in FIG. 2) of the fan 104. In the second position X2, the second major surface 154 faces obliquely towards the second casing end 118 (shown in FIG. 2), and obliquely away from the first casing end 116. In the reverse mode F2, the bypass airflow B2 moving along the second direction D2 is intercepted by the plurality of diverter fences 130 before turning towards a core engine inlet 111 of the core engine 110 (shown in FIGS. 1 and 2) at the first casing end 116.

In some embodiments, at least a portion of the core engine casing 114 axially disposed between the first casing end 116 and the trailing edge 134 of each diverter fence 130 along the principal rotational axis 102 is continuous and devoid of any passage that fluidly communicates the bypass duct 122 (shown in FIGS. 1 and 2) with the core engine 110 (shown in FIGS. 1 and 2). Thus, the bypass airflow B2 may enter the core engine inlet 111 only after turning at the first casing end 116.

In some embodiments, in the second position X2, each diverter fence 130 is configured to direct the airflow A2 in the bypass duct 122 (or the bypass airflow B2) radially outwards and circumferentially with respect to the principal rotational axis 102. Thus, each diverter fence 130 may provide radial and circumferential guidance to the bypass airflow B2 as the bypass airflow B2 negotiates a turn at the first casing end 116 of the core engine casing 114 to enter the core engine inlet 111 as the core airflow C2. For example, a flow line 150 of the bypass airflow B2 is deflected radially outwards by the plurality of diverter fences 130 as the flow line 150 turns towards the core engine inlet 111. Thus, a radius of curvature of the flow line 150 may be increased by the plurality of diverter fences 130 as the flow line 150 turns towards the core engine inlet 111. Specifically, the flow line 150 is intercepted by the second major surface 154 of the plurality of diverter fences 130 to direct the flow line 150 radially outwards since the outboard edge 138 of each diverter fence 130 is radially spaced apart from the casing outer surface 120. In some embodiments, the radius of curvature of the flow line 150 while turning towards the core engine inlet 111 may increase about 50 times as compared to a radius of curvature of the flow line 150 without the plurality of diverter fences 130.

In some embodiments, an extent of radial guidance may depend on the fence inclination angle FA (shown in FIG. 5B). The outward radial deflection may be provided due to lifting of the second major surface 154 of each diverter fence 130 that provides smooth guidance of the flow line 150 (see FIG. 6) as the flow line 150 turns towards the core engine inlet 111 of the core engine 110 (shown in FIGS. 1 and 2). This may eliminate flow separation (or duct separation) at a radially outer annular portion 113 of the core engine inlet 111 downstream the first casing end 116, and mitigate formation of pressure separation regions at the radially outer annular portion 113, thereby mitigating steep gradation of total pressure distribution at the core engine inlet 111. Thus, the core airflow C2 may evenly fill all the annular extents of the core engine inlet 111 that otherwise would have resulted in flow separation zones.

In some embodiments, the fence inclination angle FA (shown in FIG. 5B) may be determined based on the extent of radial and circumferential guidance required. At the lower angles, the radial guidance may be predominantly experienced, while at the higher angles, the circumferential guidance may be predominantly experienced. In some embodiments, the fence inclination angle FA may be from about 15 degrees to about 60 degrees for both the radial guidance and the circumferential guidance to be experienced. In some embodiments, the fence inclination angle FA may be actively varied based on change in the pitch of the blades 108 (shown in FIGS. 1 and 2) of the fan 104 (shown in FIGS. 1 and 2). Further, appropriate values for the fence inclination angle FA (shown in FIG. 5B) may be chosen based on a configuration, a size, and an architecture of the gas turbine engine 100 (shown in FIGS. 1 and 2).

Further, each diverter fence 130 is also configured to direct the bypass airflow B2 circumferentially since the inboard edge 136 of each diverter fence 130 (or the pivot axis P) is circumferentially and obliquely inclined with respect to the principal rotational axis 102 by the pivot inclination angle PA (shown in FIG. 3B). For example, the flow line 150 of the bypass airflow B2 is intercepted by the second major surface 154 of each diverter fence 130 and turned circumferentially before the flow line 150 (see FIG. 6) negotiates the turn at the first casing end 116 of the core engine casing 114 to enter the core engine inlet 111. Further, the bypass airflow B2 may move through the flow channels 170 (shown in FIGS. 5A and 5B) before turning towards the core engine inlet 111.

In some embodiments, an extent of the circumferential guidance provided by each diverter fence 130 may be based on the pivot inclination angle PA (shown in FIG. 3B). At lower angles, the extent of the circumferential guidance may be limited while a pressure loss due to the diverter fences 130 may be lower. At higher angles, the extent of the circumferential guidance may be greater along with higher pressure loss due to the diverter fences 130. Thus, a value for the pivot inclination angle PA (shown in FIG. 3B) may be chosen based on consideration of the circumferential guidance required versus the pressure loss created due to the plurality of diverter fences 130.

Figure 7A:
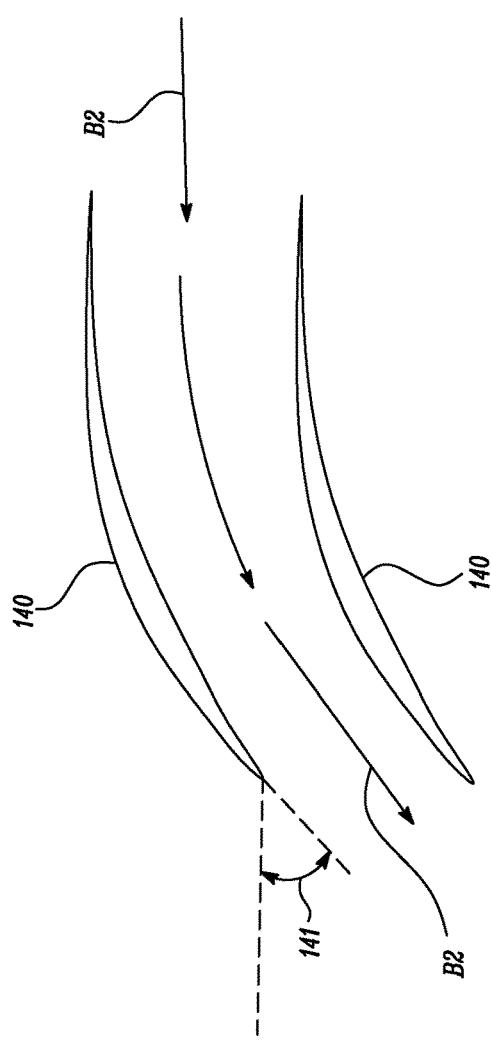
FIG. 7A and FIG. 7B are schematic sectional views of stator vanes of the gas turbine engine, according to an embodiment of the present disclosure.

FIG. 7A illustrates schematic sectional view of the plurality of OGVs 140 (as shown in FIG. 2) as viewed radially inwards towards the principal rotation axis 102. Specifically, FIG. 7A illustrates the plurality of OGVs 140 in a blade-to-blade configuration. Referring now to FIGS. 6 and 7A, the bypass airflow B2 may be deflected by the plurality of OGVs 140 before the bypass airflow B2 reaches the plurality of diverter fences 130. Thus, the plurality of OGVs 140 may direct the bypass airflow B2 towards the OGV inlet angle 141 as the bypass airflow B2 exits the plurality of OGVs 140. In some embodiments, the OGV inlet angle 141 may vary from about 15 degrees to about 45 degrees in typical gas turbine engines 100 (shown in FIGS. 1 and 2).

Figure 7B:
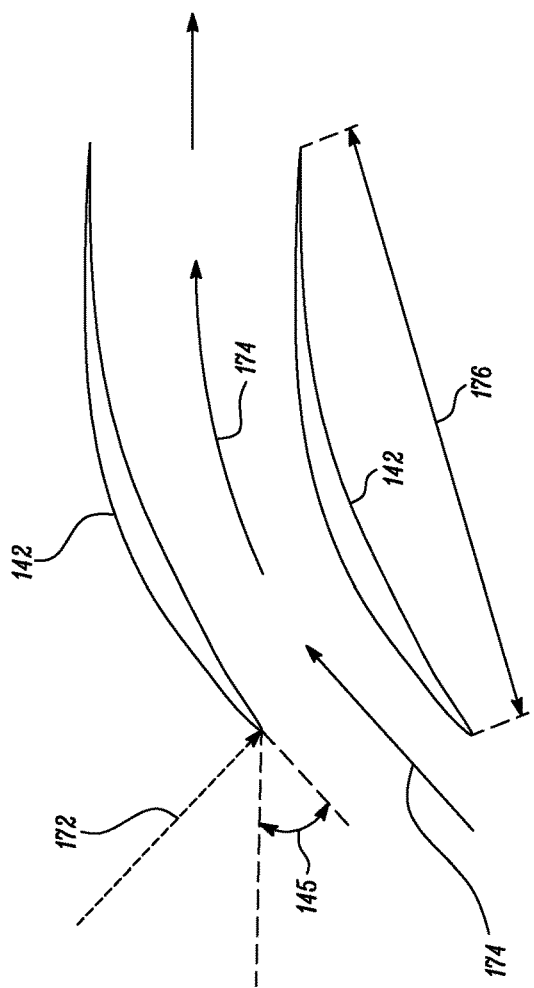

FIG. 7B illustrates schematic sectional view of the plurality of stator vanes 142 (as shown in FIG. 6) as viewed radially inwards towards the principal rotation axis 102. Specifically, FIG. 7B illustrates the plurality of stator vanes 142 in a blade-to-blade configuration.

Referring now to FIGS. 6 and 7B, the diverter fences 130 may circumferentially guide the bypass airflow B2 through the flow channels 170 (shown in FIGS. 5A and 5B) to appropriately align the core airflow C2 (resulting from the bypass airflow B2) with an inlet angle 145 of the plurality of stator vanes 142. The difference between the OGV inlet angle 141 (shown in FIG. 7A) and the inlet angle 145 of the plurality of stator vanes 142 may be from about 60 degrees to about 120 degrees depending upon the configuration of the gas turbine engine 100. Thus, with diverter fences 130, deterioration of the engine performance due to the mismatch between the OGV inlet angle 141 (shown in FIG. 7A) and the inlet angle 145 of the plurality of stator vanes 142 may be mitigated.

A flow line 172 represents airflow incident on each stator vane 142 in the reverse mode F2 of the fan 104 (shown in FIGS. 1 and 2) if the plurality of diverter fences 130 are absent. A flow line 174 represents airflow incident on each stator vane 142 in the reverse mode F2 of the fan 104 (shown in FIGS. 1 and 2) when each diverter fence 130 is in the second position X2 (shown in FIGS. 2, 5A-6). Further, the flow lines 172, 174 represent the core airflow C2 (shown in FIGS. 2 and 6).

The plurality of diverter fences 130 may circumferentially guide the bypass airflow B2 to appropriately align the flow line 174 (of the core airflow C2) with the inlet angle 145 of the plurality of stator vanes 142. This may reduce adverse negative incidence of the flow line 172 on the plurality of stator vanes 142, thereby mitigating stagnation of flow along an aerofoil of the plurality of stator vanes 142 (or aerofoil separation).

Thus, the deployment of the plurality of diverter fences 130 during the aircraft landing may eliminate the duct separation at the first casing end 116 of the core engine casing 114 and the aerofoil separation at the plurality of stator vanes 142. This may consequently ensure a stable operation of the core engine 110 (shown in FIGS. 1 and 2) to produce power for the fan 104 in the reverse mode F2 (shown in FIG. 2).

It should be understood that the present invention is equally applicable to aero gas turbine engines, marine gas turbine engines, and land-based gas turbine engines.

It will be understood that the invention is not limited to the embodiments above described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A gas turbine engine having a principal rotational axis, the gas turbine engine comprising:
   a fan coaxial with the principal rotational axis;
   a nacelle circumferentially surrounding the fan;
   a core engine disposed downstream of the fan and extending along the principal rotational axis;
   a core engine casing circumferentially surrounding the core engine around the principal rotational axis, wherein the core engine casing extends along the principal rotational axis from a first casing end to a second casing end downstream of the first casing end, wherein the first casing end is proximal to the fan, and wherein the core engine casing comprises a casing outer surface;
   a bypass duct defined between the nacelle and the core engine casing;
   a plurality of diverter fences pivotally coupled to the core engine casing proximal to the first casing end, such that each diverter fence from the plurality of diverter fences is pivotable relative to the core engine casing about a pivot axis, wherein the plurality of diverter fences are arranged circumferentially around the principal rotational axis, wherein the pivot axis is circumferentially and obliquely inclined with respect to the principal rotational axis by a pivot inclination angle, and wherein each diverter fence comprises:
      a leading edge facing the first casing end and axially spaced apart from the first casing end along the principal rotational axis;
      a trailing edge opposite to the leading edge;
      an inboard edge extending between the leading edge and the trailing edge along the casing outer surface, wherein the inboard edge at least partially engages the casing outer surface; and
      an outboard edge opposite to the inboard edge and extending between the leading edge and the trailing edge; and
   an actuation mechanism operatively coupled to each diverter fence;
   wherein each diverter fence is configured to move between a first position in which the outboard edge is disposed adjacent to the casing outer surface and a second position in which the outboard edge is radially spaced apart from the casing outer surface, and wherein, in the second position, each diverter fence radially extends outwards from the casing outer surface into the bypass duct; and
   wherein the actuation mechanism is configured to selectively move each diverter fence between the first position and the second position.

2. The gas turbine engine of claim 1, further comprising a plurality of outlet guide vanes (OGVs)) arranged around the principal rotational axis, wherein each OGV from the plurality of OGVs is disposed between the nacelle and the core engine casing, and wherein the plurality of diverter fences are axially disposed between the first casing end and the plurality of OGVs with respect to the principal rotational axis.

3. The gas turbine engine of claim 1, further comprising a plurality of stator vanes coupled to the core engine casing proximal to the first casing end, wherein the core engine casing further comprises a casing inner surface, such that the plurality of stator vanes radially extend inwards from the casing inner surface towards the principal rotational axis, and wherein at least a portion of each of the plurality of diverter fences is axially disposed between the first casing end and the plurality of stator vanes with respect to the principal rotational axis.

4. The gas turbine engine of claim 1, wherein the fan is configured to selectively operate in a normal mode and a reverse mode, wherein, in the normal mode, the fan is configured to generate an airflow in a first direction from the first casing end to the second casing end, and wherein, in the reverse mode, the fan is configured to generate an airflow in a second direction opposite to the first direction.

5. The gas turbine engine of claim 4, wherein, in the normal mode, the plurality of diverter fences are in the first position, and wherein, in the reverse mode, each diverter fence is in the second position, such that each diverter fence is configured to direct an airflow in the bypass duct radially outwards and circumferentially with respect to the principal rotational axis.

6. The gas turbine engine of claim 1, wherein each diverter fence further comprises:
a first major surface defined between the leading edge, the trailing edge, the inboard edge, and the outboard edge, wherein, in the first position, the first major surface contacts the casing outer surface; and
a second major surface opposite to the first major surface, wherein, in the second position, the second major surface faces obliquely towards the second casing end and obliquely away from the first casing end.

7. The gas turbine engine of claim 6, wherein the second major surface follows a shape of the casing outer surface, such that, in the first position, the second major surface is flush with the casing outer surface.

8. The gas turbine engine of claim 6, wherein each diverter fence has a constant thickness between the first major surface and the second major surface.

9. The gas turbine engine of claim 6, wherein each of the first major surface and the second major surface is curved.

10. The gas turbine engine of claim 1, wherein the outboard edge follows a shape of the casing outer surface, such that, in the first position, the outboard edge is flush with the casing outer surface.

11. The gas turbine engine of claim 1, wherein each diverter fence has a constant radial distance between the inboard edge and the outboard edge.

12. The gas turbine engine of claim 1, wherein each of the inboard edge and the outboard edge is curved.

13. The gas turbine engine of claim 1, wherein each of the leading edge and the trailing edge is linear.

14. The gas turbine engine of claim 1, wherein each diverter fence has a constant axial distance between the leading edge and the trailing edge.

15. The gas turbine engine of claim 1, wherein the pivot inclination angle is from 20 degrees to 70 degrees.

16. The gas turbine engine of claim 1, wherein the leading edge extends radially from a leading inboard point intersecting with the inboard edge to a leading outboard point intersecting with the outboard edge, and wherein, in the second position, an axis joining the leading inboard point to the leading outboard point is inclined obliquely to a tangent to the casing outer surface at the leading inboard point by a fence inclination angle, and wherein the fence inclination angle is from 5 degrees to 90 degrees.

17. The gas turbine engine of claim 1, wherein the plurality of diverter fences comprise at least three diverter fences.

18. The gas turbine engine of claim 1, wherein the plurality of diverter fences are disposed equiangularly around the principal rotational axis.

19. The gas turbine engine of claim 1, wherein at least a portion of the core engine casing axially disposed between the first casing end and the trailing edge of each diverter fence along the principal rotational axis is continuous and devoid of any passage that fluidly communicates the bypass duct with the core engine.

20. The gas turbine engine of claim 1, wherein the plurality of diverter fences are disposed adjacent to each other, such that in the first position, the outboard edge of each diverter fence is disposed proximal to or in engagement with the inboard edge of an adjacent diverter fence from the plurality of diverter fences, and wherein, in the respective first positions, the plurality of diverter fences form an annular arrangement around the principal rotational axis.

\* \* \* \* \*